E. A. SORENSON.
PISTON PACKING RING.
APPLICATION FILED MAY 28, 1914.

1,126,898.

Patented Feb. 2, 1915.

Witnesses

Inventor
Eugene A. Sorenson

UNITED STATES PATENT OFFICE.

EUGENE A. SORENSON, OF WHITEHALL, WISCONSIN.

PISTON PACKING-RING.

1,126,898.　　　Specification of Letters Patent.　　Patented Feb. 2, 1915.

Application filed May 28, 1914. Serial No. 841,481.

*To all whom it may concern:*

Be it known that I, EUGENE A. SORENSON, a citizen of the United States, residing at Whitehall, in the county of Trempealeau and State of Wisconsin, has invented a certain new and useful Piston Packing-Ring, of which the following is a specification.

The present invention appertains to packing rings for the pistons of internal combustion engines, pumps, and the like, and aims to provide a novel and improved metallic packing ring.

This invention contemplates the provision of a packing ring of unique construction, whereby it will be thoroughly efficient and practical in use, the packing ring being expansible uniformly throughout its circumference, and being so constructed as to prevent leakage or escape of the fluid acting against or being acted upon by the piston.

It is also within the scope of the invention, to provide a packing ring of simple and inexpensive construction, which may be readily manufactured and applied within the usual annular groove of a piston, which may readily expand and contract to accommodate itself to the walls of the cylinder, and which will provide a fluid-tight packing between the piston and the cylinder.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in its preferred embodiment in the accompanying drawing, wherein:—

Figure 1:
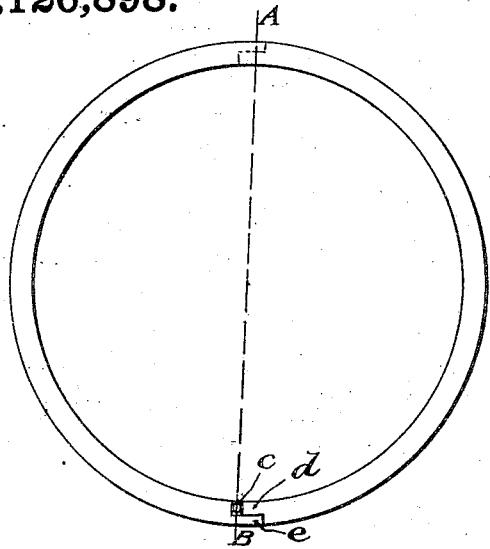
Figure 2:
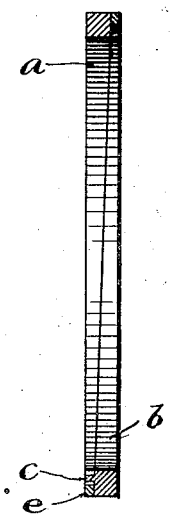
Figure 3:
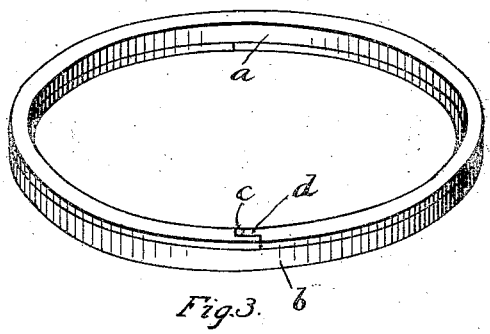

Figure 1 is a plan view of the improved packing ring. Fig. 2 is a sectional view of the device taken on the line A—B of Fig. 1. Fig. 3 is a perspective view of the packing ring.

In carrying out the present invention, the packing ring comprises two annular metallic sections *a* and *b*, which are of like external and internal diameter, and which contact facially. Each of the sections is split or divided and has its ends provided with inner and outer overlapping fingers *d* and *e*, respectively, which provide a scarf joint for the ends of the annular section. The split portions or scarf joints are spaced or arranged diametrically opposite each other, and the intermediate portion of each section opposite the ends thereof is relatively thick and the section decreases in thickness from the intermediate portion to the ends thereof. Thus, the contacting faces of the two sections will lie in a plane arranged obliquely relative to the planes of the remote faces of the sections.

The intermediate or thickest portion of the annular section *b*, is provided with a lug or stud *c* projecting from its inner face and adjacent its inner edge, so as to project between the scarf ends of the section *a*. The lug *c* is arranged adjacent the inner edges of the annular sections, so as not to interfere with the outer portion of the scarf joint of the section *a*, it being the function of the lug *c* to hold the annular section *a* and *b* against rotatory movement relative to one another, which if it occurred, would be liable to cause the packing ring to bind within the annular groove of the piston (not shown).

To apply the packing ring to a piston, the annular sections may be readily expanded over the piston and then sprung properly into the usual annular groove provided for the packing ring. The sections of the packing ring are normally under tension so as to expand snugly against the walls of the cylinder, it being noted that the annular sections in being thickest at their intermediate portions and growing thinner from the intermediate portions to the ends, will cause the annular sections to expand uniformly throughout their lengths. Furthermore, the annular sections are thinnest at the scarf joints, to reduce to a minimum, the liability of leakage, whereas the sections are thickest adjacent the opposite scarf joints, to provide a relatively thick solid portion coöperating with each scarf joint to provide a suitable bearing for contact with the inner walls of the cylinder. It is evident that each of the scarf joints being in facial contact with the opposite section, will cause the gaps between the ends of the sections, to be closed by the opposite sections, and the packing ring may therefore expand without danger of leakage. The lug *c* in projecting between the scarf ends of the section *a* will lock the two sections against relative rotary movement, and this will avoid the liability of the packing ring to bind within the groove of the piston.

From the foregoing, taken in connection with the drawing, the advantages and capabilities of the present device will be obvious to those versed in the art, it is thought, without further comment being deemed necessary.

I claim:

A packing ring embodying two annular sections of like diameter contacting facially and having opposite split portions, the ends provided by the split portions being scarfed, the intermediate portion of each section opposite the ends thereof being relatively thick and the section decreasing in thickness from the intermediate portion to the ends thereof, whereby the contacting faces of the sections will lie in a plane arranged obliquely relative to the planes of the remote faces of the sections, the intermediate portion of one section having a lug projecting between the scarfed ends of the other section.

In testimony whereof I affix my signature in the presence of two witnesses.

EUGENE A. SORENSON.

Witnesses:
SIGWALD N. HEGGE,
ELSIE M. WOOD.

Copies of this patent may be obtained for five cents each, by addressing the "Commissioner of Patents, Washington, D. C."